US008577326B2

(12) United States Patent
Bhattacharya

(10) Patent No.: US 8,577,326 B2
(45) Date of Patent: Nov. 5, 2013

(54) METHOD AND APPARATUS FOR POWER CONSERVATION FOR A MOBILE DEVICE IN IDLE MODE

(75) Inventor: Kaushik Bhattacharya, Bangalore (IN)

(73) Assignee: Nokia Corporation, Espoo (FI)

( * ) Notice: Subject to any disclaimer, the term of this patent is extended or adjusted under 35 U.S.C. 154(b) by 61 days.

(21) Appl. No.: 13/207,098

(22) Filed: Aug. 10, 2011

(65) Prior Publication Data

US 2012/0115552 A1    May 10, 2012

(30) Foreign Application Priority Data

Aug. 10, 2010   (IN) ............................ 2293/CHE/2010

(51) Int. Cl.
*H04B 1/16*     (2006.01)
*H04W 52/02*    (2009.01)

(52) U.S. Cl.
CPC ............. *H04B 1/1607* (2013.01); *H04W 52/02* (2013.01)
USPC .................. 455/343.1; 455/343.2; 455/343.5; 455/574

(58) Field of Classification Search
USPC .................... 455/574, 343.1–343.5
See application file for complete search history.

(56) References Cited

U.S. PATENT DOCUMENTS

| | | | | |
|---|---|---|---|---|
| 6,463,307 | B1 * | 10/2002 | Larsson et al. | 455/574 |
| 7,197,341 | B2 * | 3/2007 | Bultan et al. | 455/574 |
| 7,372,818 | B2 * | 5/2008 | Fraser et al. | 370/252 |
| 7,433,702 | B2 * | 10/2008 | Lindskog et al. | 455/522 |
| 7,680,071 | B2 * | 3/2010 | Bultan et al. | 370/311 |
| 2003/0144020 | A1 * | 7/2003 | Challa et al. | 455/522 |
| 2003/0185162 | A1 * | 10/2003 | Fraser et al. | 370/311 |
| 2007/0037610 | A1 * | 2/2007 | Logan | 455/574 |
| 2008/0170526 | A1 * | 7/2008 | Narang et al. | 370/311 |
| 2008/0214249 | A1 * | 9/2008 | Kim et al. | 455/574 |
| 2008/0248840 | A1 * | 10/2008 | Kim et al. | 455/574 |
| 2011/0136530 | A1 * | 6/2011 | Deshpande | 455/515 |

OTHER PUBLICATIONS

"3rd Generation Partnership Project; Technical Specification Group Radio Access Network; Physical layer procedures (FDD) (Release 9)", 3GPP TS 25.114, v9.2.0, Mar. 2010, pp. 1-98.

* cited by examiner

*Primary Examiner* — Duc M Nguyen
(74) *Attorney, Agent, or Firm* — Nokia Corporation

(57) ABSTRACT

In accordance with an example embodiment of the present invention, a method comprises determining a sleep cycle comprising a number of discontinuous reception (DRX) cycles at a user equipment (UE) based at least on one of a current available power level, a call setup delay interval, and a quality of a received paging indicator channel (PICH) signal; entering a power saving mode during the determined sleep cycle at the user equipment (UE) upon an occurrence of a triggering event; and waking up from the power saving mode and checking for an active call after an occurrence of a second triggering event.

20 Claims, 9 Drawing Sheets

```
If (time is within power-saving interval) {
    If (power saving mode is not deactivated by a user)
        Set call_setup_delay to a highest_call_setup_delay;
    Else {
        If (battery_voltage < THRESHOLD_VOLTAGE)
            Set call_setup_delay to the highest_call_setup_delay ;
        Else
            Determine call setup delay according to current battery voltage level;
    }
}
Else
    Follow normal DRX cycle.
Determine_wake_up_instant (call setup delay).
```

FIGURE 5

```
If(count_of_high_quality_signal is 0) {
    Test_PICH_signal_of_current_DRX_cycle ();
    If(PI indication is positive)
        Initiate_call_setup ();
    Else {
        If(quality_of_signal_in_current_DRX_cycle is LOW)
            Try_to_reselect_to_better_cell ();
    }
}
Else If ((if only once PICH signal has been above the predefined SIGNAL threshold) {
    test_PICH_signal_depending_on_signal_quality_of_current-and_previous_DRX_cycles();
    If(PI indication is positive from above test)
        Initiate_call_setup ();
    Else If(quality_of_signal_in_current_DRX_cycle is LOW)
        Try_to_reselect_to_better_cell ();
    update_quality_signal_counters ();
}
Else if ((if more than once PICH signal has been above the predefined SIGNAL threshold) {
    Determine_callsetup_delay_duration ();
    If (Quality_of_signal_received_in Current_DRX_cycle is less than predefined_Signal_
Threshold) {
        Test_high_quality_PICH_signal_sample_from_previous_DRX_cycles_In_sample_RAM ();
        If(PI indication is positive)
            Initiate_call_setup ();
        Else {
            Test_PI_on_PICH_received_in_Current_DRX_cycle ()
            If(PI indication is positive)
                Initiate_call_setup ();
            Else if (signal quality in current DRX cycle is low then:
                Try_to_reselect_to_better_cell ();
        }
    }
    Else {
        Test_PICH_signal_of_current_DRX_cycle ();
        If (PI indication is positive)
            Initiate_call_setup ();
    }
    If (if more than once PICH signal has been above the predefined SIGNAL threshold)
        Update_the_quality_signal_counters ();
}
Update_the_signal_quality_tracking_variables ();
```

FIGURE 6

METHOD AND APPARATUS FOR POWER CONSERVATION FOR A MOBILE DEVICE IN IDLE MODE

RELATED APPLICATIONS

This application claims priority to India Application No. 2293/CHE/2010 filed on Aug. 10, 2010, and is incorporated herein by reference in its entirety.

TECHNICAL FIELD

The present application relates generally to an apparatus and a method for power conservation for a mobile device in idle mode.

BACKGROUND

When a user equipment (UE) is put in idle mode where there is not an active radio resource control (RRC) connection, the UE may continue going through discontinuous reception (DRX) cycles. In each DRX cycle, the UE sleeps for certain amount of time determined by an associated access network such as a Universal Terrestrial Radio Access Network (UTRAN), and then wakes up to see if there is any incoming call by checking the paging indicator channel (PICH) at a predetermined paging occasion. The DRX cycle goes on continuously when UE is camped on to a cell. It consumes energy that each time the UE wakes up and performs tasks such as monitoring for active calls, even the chance for receiving a call during certain time period of a day such as hours from mid night to early morning is very low.

SUMMARY

Various aspects of the invention are set out in the claims.

In accordance with an example embodiment of the present invention, a method comprises determining a sleep cycle comprising a number of discontinuous reception (DRX) cycles at a user equipment (UE) based at least on one of a current available power level, a call setup delay interval, and a quality of a received paging indicator channel (PICH) signal; entering a power saving mode during the determined sleep cycle at the user equipment (UE) upon an occurrence of a triggering event; and waking up from the power saving mode and checking for an active call after an occurrence of a second triggering event.

In accordance with an example embodiment of the present invention, an apparatus comprises a signal measurement unit configured to wake up and collect a paging indicator channel (PICH) signal, and a paging indicator random access memory (RAM) buffer configured to store a PICH signal sample with a quality higher than a predefined threshold. The apparatus also comprises a control processor configured to determine a sleep cycle comprising a number of discontinuous reception (DRX) cycles at a user equipment (UE) based at least on one of a current available battery power level, a call setup delay interval, and a quality of a received paging indicator channel (PICH) signal; enter a power saving mode during the determined sleep cycle at the user equipment (UE) upon an occurrence of a triggering event; and wake up from the power saving mode and checking for an active call after an occurrence of a second triggering event.

BRIEF DESCRIPTION OF DRAWINGS

For a more complete understanding of example embodiments of the present invention, reference is now made to the following descriptions taken in connection with the accompanying drawings in which:

FIG. 5 illustrates an example algorithm for determining call setup delay in accordance with an example embodiment of the invention;

FIG. 6 illustrates an example algorithm determining call setup delay in accordance with an example embodiment of the invention;

DETAILED DESCRIPTION

Disclosed herein are a method and an apparatus for further saving battery power when the UE is in an idle mode. The UE takes into account the parameter such as time of the day, and the number of times the paging is repeated before waking up from deep sleep to monitor the paging indicator channel for an arrival of an incoming call.

An example embodiment of the present invention and its potential advantages are best understood by referring to FIGS. 1 through 8 of the drawings, like numerals being used for like and corresponding parts of the various drawings.

Figure 1:
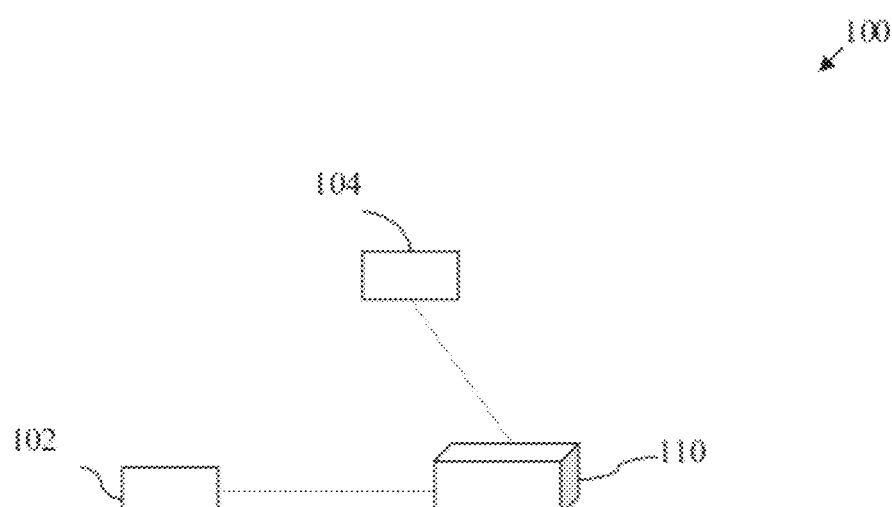
FIG. 1 illustrates an example wireless system 100 that supports power saving mode operation in accordance with an example embodiment of the invention.
Figure 2:
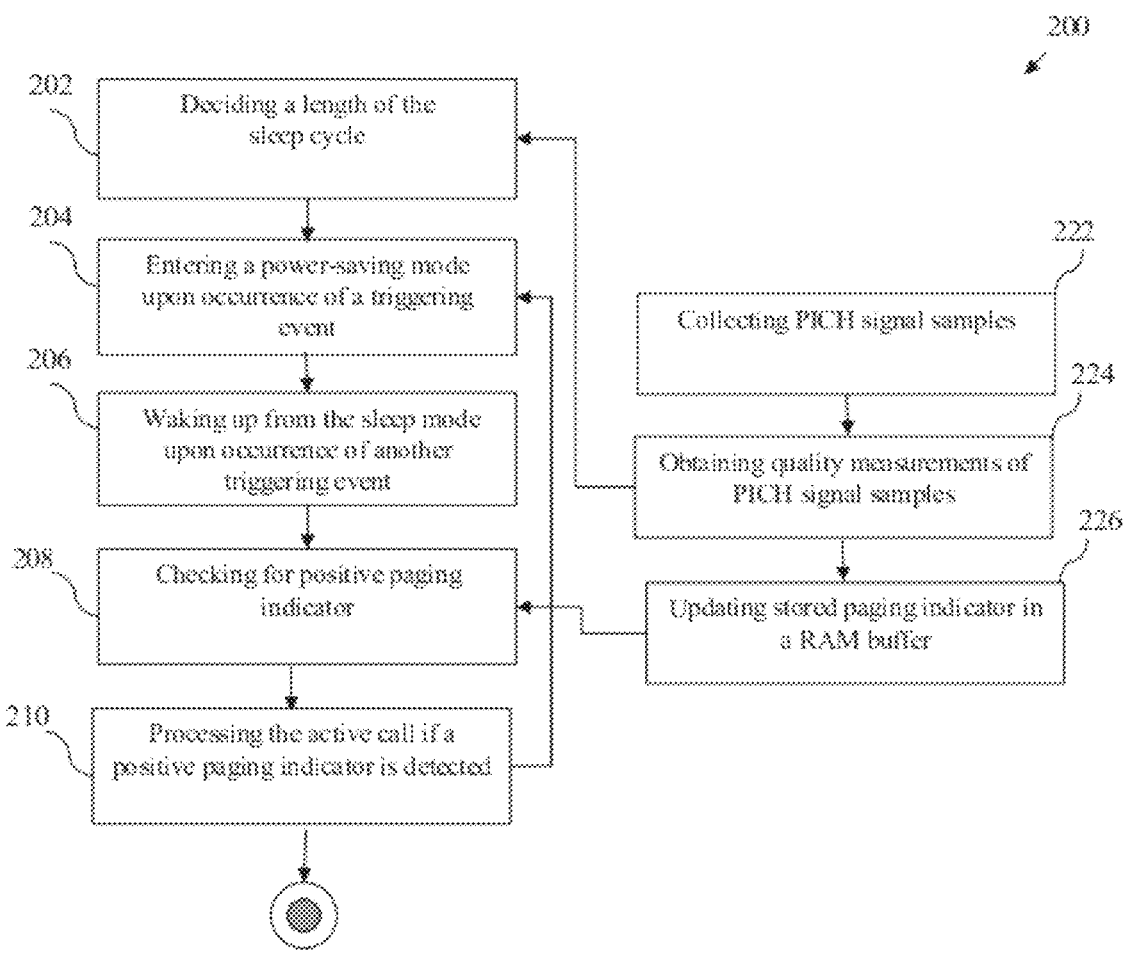
FIG. 2 illustrates an example method for power saving operation in accordance with an example embodiment of the invention.
Figure 4:
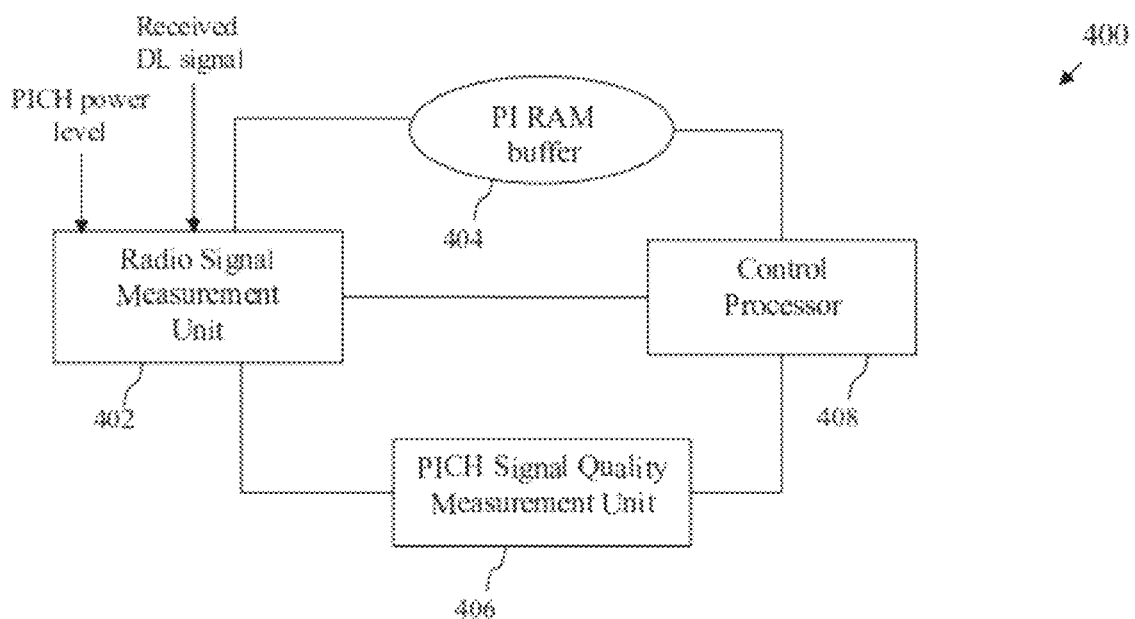
FIG. 4 illustrates an example apparatus for supporting power saving operation in accordance with an example embodiment of the invention.
Figure 8:
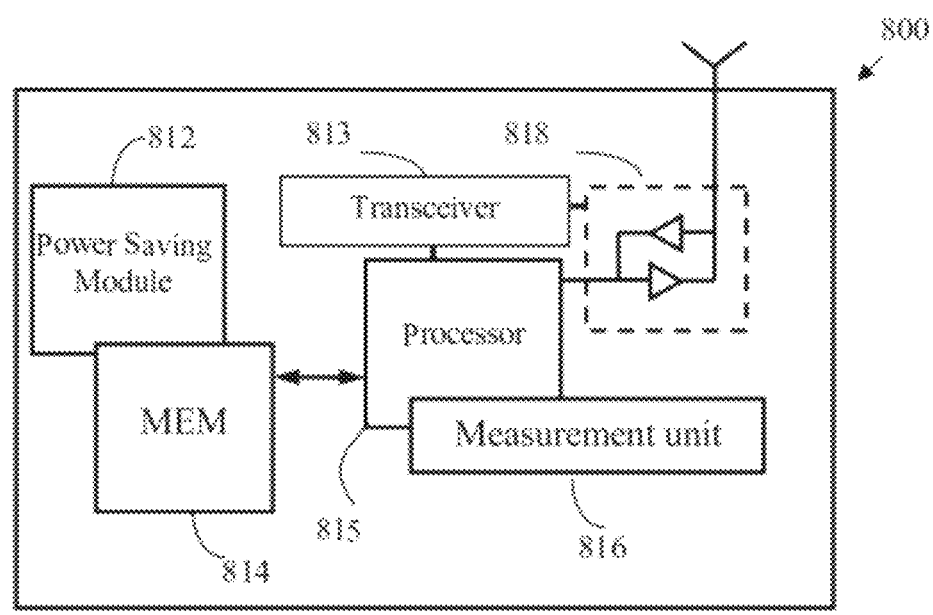
FIG. 8 illustrates an example wireless apparatus in accordance with an example embodiment of the invention.

FIG. 1 illustrates an example wireless system 100 that supports power saving mode operation in accordance with an example embodiment of the invention. The wireless system 100 includes a base station 110 such as a LTE Node B (nodeB) and two associated UEs 102 and 104. The UEs 102 and 104 may contain a power saving module as illustrated in FIG. 4 and FIG. 8 and described hereinafter and may be configured to execute a method as illustrated in FIG. 2 and described hereinafter. The power saving module of each UEs may operate independently without any input from any other network nodes or in collaboration with the base station 110.

In one example embodiment, the UEs 102 and 104 enter a sleep mode as a triggering event occurs. The triggering event may be an arrival of a predefined time period when the chance of receiving a call is low, the time period such as 11 o'clock in the night. The UE 102 and UE 104 may have separate, independent triggering events. For example, the UE 102 may enter the sleep mode at 11 pm and the UE 104 may enter the sleep mode at 11:30 pm. The UEs 102 and 104 may wake up from the sleep mode after a predefined sleep cycle, check for active call indicator at a call indicator buffer or on a paging indicator channel and process the active call if there is one. The sleep cycle may include a predefined number of DRX cycles and the number of the DRX cycles may depend on a number of factors, such as a quality of the paging indicator channel, a current power level, a desired call setup delay, and the like. The UE 102 may have a sleep cycle that is different from that of the UE 104, because the factors affecting the number of DRX cycles in a sleep cycle may be different. If the UE 102 or the UE 104 detects an active call, it proceeds to processing the active call and the UE may go back into the power saving mode after the call, if there is not any other triggering event to interrupt the sleep cycle.

In one example embodiment, the owner of UE 102 may manually interrupt the sleep cycle and wake up the UE 102 via a user interface menu option. In another example embodiment, the base station 110 may uniformly define a sleep cycle for all UEs within a cell or an access network and send the sleep cycle to the UEs via broadcast or point-to-point messages. The base station 110 may decide the sleep cycle based on the current and past system wide traffic conditions, the number of UEs in the cell, and other factors. Each UE such as the UE 102 or the UE 104 within the cell may take the default sleep cycle sent from the base station 110 or override it with its own sleep cycle.

FIG. 2 illustrates an example method 200 for power saving operations at a UE such as the UE 102 and the UE 104 of FIG. 1. The method 200 may include deciding a length of a sleep cycle at block 202, entering a power-saving mode upon occurrence of a triggering event at block 204, and waking up from the sleep mode upon occurrence of another triggering event at block 206. The method 200 may also include checking for positive paging indicator at block 208 and setting up a call if a positive paging indicator is detected. The method 200 may also include collecting PICH signal samples at block 222, obtaining quality measurements of PICH signal samples at block 224 and updating a stored paging indicator in a random access memory (RAM) buffer at block 226.

In one example embodiment, deciding the length of the sleep cycle at block 202 may include deciding on a number DRX cycles included within the sleep cycle based on factors such as a current battery power level, a measured quality of received PICH signals, and a call setup delay. In one example embodiment, if the current available battery power level is high, the power saving strategy may be less aggressive. On the other hand, if the available power level is lower than a threshold point, a more aggressive power saving strategy may be adopted to enter the power-saving mode sooner and the sleep cycles may be longer than would otherwise. In one example embodiment, the measured quality of PICH signals may also be taken into consideration for deciding the length of the sleep cycle. For example, if the measured quality of the PICH signal is poor, the power saving strategy may be less aggressive and sleep cycle shorter so that the UE may wake up more frequently to check PICH to avoid missing an active call due to a poor quality of signal transmissions.

In one example embodiment, deciding the length of the sleep cycle at block 202 may include taking into consideration the call setup delay. For example, if the desired call setup delay is shorter than normal, the power saving strategy may be less aggressive and sleep cycle may be shorter in order to accommodate a shorter call-setup delay. The call setup delay may set an upper bound on the DRX cycles, if the perceived delay by the user in receiving a call is to be minimized. If there is a need, the length of the sleep may be set in such a way that the UE wakes up at every DRX cycle as in busy mode of operation of the UE during day time.

In one example embodiment, deciding the length of the sleep cycle at block 202 may also include taking into consideration the past history of sample signals. For example, if the UE received a string of high quality PICH signals for a minimum duration continuously in the past, the number of DRX cycles in the sleep cycle may be set higher for a deep sleep to further save battery power. In addition, the mobility of the UE may also be considered. During off-peak night time UE likely remains stationary, if the UE continues getting good signal for a minimum number of DRX cycles, and if total number of DRX cycles in the sleep cycle is less than a limit (in terms of time duration), the quality of the downlink signal may likely not change much in next DRX cycle. So if these conditions are satisfied and paging indicator is repeated a minimum number of times such as three times, the UE may enter a deep sleep mode and switch off everything to further conserve power.

In one example embodiment, a base station such as the nodeB 110 of FIG. 1 may decide a sleep cycle for power saving operation and decide the number of DRX cycles on an access network wide or cell wide basis. The base station may send to all UEs in the access network or the cell a length of the sleep cycle via a system information block (SIB) message. In this case, a UE may either adopt the cell-wide length of the sleep cycle or override the default sleep cycle with its own. In the former case, the consideration of power level, measured quality of PICH signal and call setup delay may be skipped.

In one example embodiment, entering the power saving mode at block 204 may include entering the power saving mode upon occurrence of a triggering event. The triggering event may include an arrival of a time of a day such as night time when the chance of receiving a call is very low. The triggering events may also include a low battery level of the UE and a manual activation of power saving mode by a user via a user interface such as the one shown in FIG. 7. In one example embodiment, entering the power saving mode at block 204 may include entering one of different levels of power saving mode. For example, in a deep power saving mode, all processing modules may be turned off to conserve more power. In a medium level of power saving mode, all processing modules except for some essential units such as a PICH signal unit may be shut down.

In one example embodiment, waking up from the power saving mode at block 206 may include waking up from the power saving mode upon occurrence of another triggering event. The triggering event may be one of an expiration of the sleep cycle with a predefined number of DRX cycles, and a manual interruption of the power saving mode. The number of DRX cycles within a sleep cycle may be set according to the factors described above at block 202 or may be set manually by the user according to a need to overwrite the predetermined DRX cycles. In addition, a user may also interrupt the sleep cycle on a need basis. For example, in middle of a night, a user may have the UE enter the active mode in anticipation of a conference call from a different time zone.

In one example embodiment, checking for positive paging indicator at block 208 may include checking the PICH channel to see if any active call indicator arrives at that moment. In another embodiment, checking for positive paging indicator at block 208 may also include checking a RAM buffer that may store the latest positive paging indicator. Multiple positive paging indicators may be sent from a base station in an attempt to establish a call and only the latest indicator with a quality higher than a threshold may be stored in the RAM buffer. If checking for the positive call indicator at block 208 yields a positive result, processing active call at block 210 may include proceeding to establishing a connection for the call and processing the call to its completion. The processing active call at block 210 may also include entering the sleep mode once the active call is processed to completion if there is not any new triggering event that has occurred during the call processing to interrupt the power saving mode.

In one example embodiment, collecting PICH signal samples at block 222 may include waking up at each of DRX cycles and performing a quick PICH signal sample collection.

The sample collection may be performed by a small portion of the UE with minimal power consumption in part because the task of collecting radio signal sample is simple with little complication of additional tasks. Sample collection may be performed independently from waking up from the power saving mode to check for the positive call indicator, partially because collecting radio signal sample such a PICH single is relatively simple and short. Collecting the PICH signal samples at block 222 may also include putting the collected samples into a RAM storage for subsequent processing. Depending on time of the day, either one or multiple collected PICH signal samples may be put in the RAM storage. During the day time, multiple PICH signal samples may be stored to increase the reliability. During the night time, a single PICH signal sample may be sufficient.

In one example embodiment, obtaining quality measurements on PICH signal at block 224 may include taking measurement as the PICH signal is collected without first storing the PICH signals. In an alternative embodiment, obtaining quality measurements on PICH signals at block 224 may include taking collected radio signal samples from the RAM storage and take measurements of the signal samples. Obtaining quality measurements of the collected PICH signal samples at block 224 may also include aggregating multiple radio signals of the collected samples over previous DRX periods and averaging them out to obtain a collective quality measurement. The obtained quality measurements of the PICH signals may be fed into the step of deciding the length of sleep cycle at block 202 for deciding the length of the sleep cycle. More details on obtaining quality of PICH signals may be found in FIG. 6 and described hereafter.

In one example embodiment, if PICH signal quality is high and a paging indicator is tested negative, it may mean that the paging indicator has not been transmitted in that DRX cycle and a positive paging indicator had not been transmitted in the previous (N−1) DRX cycle. If the UE misses a paging indicator, the paging indicator would be repeated N times by the base station. Hence if the paging indicator is tested negative at a particular DRX cycle when the PICH quality is high, the paging indicator information is believed to be reliable. If the positive paging indicator has been transmitted in the past (N−1) DRX cycles, the paging indicator should be positive at the current DRX cycle.

In one example embodiment, if the PICH quality is below a predefined threshold, the paging indicator information may not be as reliable as otherwise. If the paging indictor is tested positive in this case, the UE may contact the associated network to set up call to avoid any chance of missing the call due to poor PICH quality. If the paging indicator is tested negative, it may not be ascertained whether the paging indicator is actually negative or an erroneous indicator due to the poor quality of PICH signals. Thus in one example embodiment, when the PICH signal quality goes below a predefined threshold and the paging indicator is positive, a cell reselection may be initiated to obtain a better-quality PICH signal. In another example embodiment, if the PICH signal quality is low, and the paging indicator is negative, the reselection may be initiated regardless. In another embodiment, the decision of reselection may depend on an accumulative count of times when the low-quality PICH signals are received over a number of times the paging indicator is repeated.

In one example embodiment, updating the RAM paging indicator at block 226 may include updating the positive call indicator buffer according to the quality of the received call indicator. If the quality of the collected call indicator is better than a threshold value and the buffer is empty, the collected call indicator is stored. Otherwise, the stored call indicator in the RAM buffer is retained. The updated paging indicator stored in the RAM buffer may be used for checking for positive call indicator at block 208.

In one example embodiment, the method 200 may be implemented at the UE 102 and the UE 104 of FIG. 1 or by the apparatus 800 of FIG. 8. The method 200 is for illustration only and the steps of the method 200 may be combined, divided, or executed in a different order than illustrated, without departing from the scope of the invention of this example embodiment.

Figure 3:
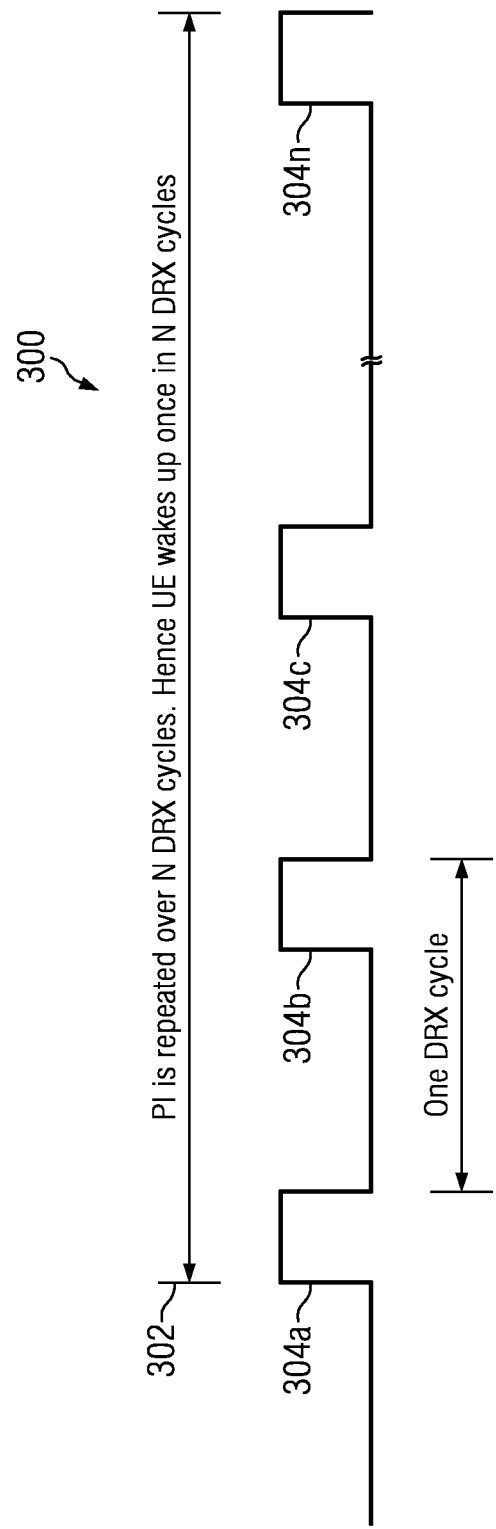
FIG. 3 illustrates an example sleep mode in accordance with an example embodiment of the invention.

FIG. 3 illustrates example power saving mode 300 for a UE in accordance with an example embodiment of the invention. The example power saving mode 300 may include a sleep cycle 302 and the sleep cycle 302 may include N DRX cycles numbered 304a through 304n. An associated base station may repeat a paging indicator once a DRX cycle and the UE in the power saving mode 300 may wake up once each sleep cycle, or N DRX cycles to check for the paging indicator for an active call. The length of each DRX cycle is determined by the base station and is known to each UE via a standard protocol. The length of the sleep cycle, or N DRX cycles is determined by the method as described above in the description of FIG. 2.

FIG. 4 illustrates an example apparatus 400 for supporting power saving mode operation in accordance with an example embodiment of the invention. The example apparatus 400 may include a radio signal measurement unit 402, a paging indicator (PI) RAM buffer 404, a PICH signal quality measurement unit 406 and a control processor 408.

In one example embodiment, the radio signal measurement unit 402 is configured to received downlink signals and a default PICH signal transmission power level, wake up at each DRX cycle, collect PICH signal samples on the PICH channel and pass the collected signal samples to the PICH signal quality measurement unit 406. The PICH signal quality measurement unit 406 may be configured to estimate PICH signal power level based on the received signal code power (RSCP) of the common pilot channel (CPICH) and a default PICH transmission power which may be configured by the network side and passed to the radio signal measurement unit 402 from a higher network layer. The PICH signal quality measurement unit 406 may be further configured to estimate a downlink signal quality. If the signal quality is higher than a predefined threshold, the PICH signal quality measurement unit 406 may be configured to store the signal into a PICH signal sample buffer maintained within the PICH signal quality measurement unit 406 if the buffer is empty. The signal sample data in the PICH signal quality unit 406 may not be processed or decoded immediately. Actual processing task may include applying a different channelization code such as an Orthogonal Variable Spreading Factor (OVSF) code with a correlation algorithm to extract PICH data from a signal channel. In the subsequent DRX cycles, if the quality of the received PICH signal is higher than a predefined threshold value, the stored PICH signal sample may be maintained. Also when one complete sleep cycle period reaches the end of a call setup delay period, the signal samples stored in the sample RAM buffer are flushed because the stored signal samples may become stale.

In one example embodiment, if there is a positive call indicator on the PICH channel, the paging indicator is received by the radio signal measurement unit 402 and stored in the paging indicator RAM buffer 404. The control processor 408 is configured to detect a triggering event such as an expiration of a sleep cycle and wake up and check for the active call in the in paging indicator RAM buffer 404 when a triggering event is detected. If there is an active paging indicator, the control process 408 is configured to process the active call in coordination with other modules of the UE.

In one embodiment, the control processor 408 or the PICH signal quality measurement unit 406 may be configured to maintain a counter to keep track of the number of times the PICH quality value goes above a defined threshold, and reset the counter to zero when the control processor 408 wakes up to end the current sleep cycle. If the UE receives PICH signal with quality lesser than a threshold value in any of the DRX cycles of the sleep cycle, the control processor 408 may be interrupted in the DRX cycle to facilitate the reselection to get a good-quality channel. On the other hand, when the PICH signal quality in the previous DRX cycle was high and the PICH signal quality in the immediately subsequent DRX cycle is also high, the control processor 408 is not interrupted from the power saving mode. In one embodiment, the two variables may be maintained at the UE, such as a current signal quality and a previous signal quality, to keep track of the current and previous DRX cycle signal quality. These two variables may be set to a binary value such as high or low to simplify the counter operation. As described above, the central processor 408 may be configured to check only one PICH frame with minimal power consumption if the signal is of a quality higher than a threshold while in the power saving mode. In one example embodiment, the control processor 408 is a layer-1 protocol processor.

FIG. 5 illustrates an example algorithm 500 for determining call setup delay in accordance with an example embodiment of the invention. In one example embodiment, according to the example algorithm 500, the call set up delay may be set to a maximum call setup delay possible if the current time is within the designated power saving interval and if there is no manual deactivation of the power saving mode. The maximum call setup delay may be determined based on a maximum delay tolerance level that the user may have. In case that the current battery level is below a predetermined threshold value, the call setup delay may be set to the maximum call setup delay to conserve the power. Otherwise, if the current battery power level is above the threshold value, the call setup delay may be set according to actual available power level. If the current time is outside the power saving time interval, a normal DRX cycle is followed and the UE may wake up at each DRX cycle to check for an active call indicator. The call setup delay may be used to determine the number of DRX cycles between two consecutive UE wakeups.

The algorithm 500 is for illustration only and it may be extended to accommodate other situation without departing from this invention. For example, if there is a need, the algorithm may be extended to time intervals of the day other than the power-saving interval during night time. The current available battery level is taken into account because operation and saving requirements of the UE may change depending on the battery voltage level. The step of determining the parameter "call setup delay" from battery voltage may be performed via a table lookup method.

Figure 5A:
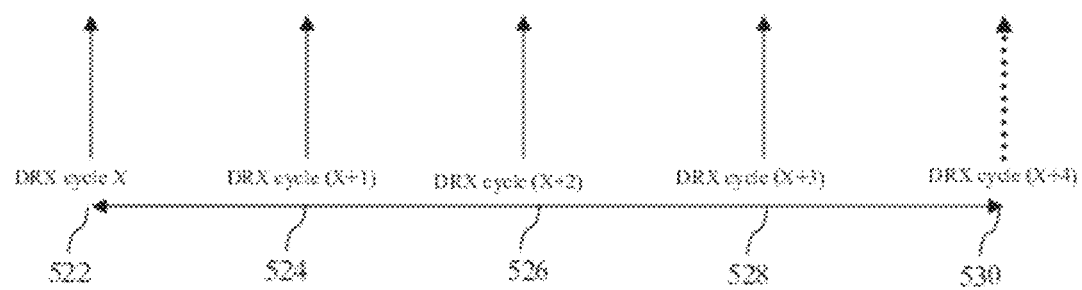
FIG. 5a illustrates an example operation of the algorithm for determining call setup delay in accordance with an example embodiment of the invention.

FIG. 5a shows an example operation 500a of the algorithm 500 for setting call setup delay. In the example operation 500a, the call setup delay duration includes 4 DRX cycles. At the beginning of the first DRX cycle X labeled 522, because the quality of the received signal is higher than a threshold, the stored signal in the RAM buffer is overwritten and the control processor is not interrupted. At the beginning of the DRX cycle X+1 labeled 524, the received signal quality is higher than the threshold and the store high quality signal obtained at the DRX cycle X is overwritten and the control processor remains uninterrupted. In a similar fashion, during the subsequent DRX cycles 526, 528 and 530, the received PICH signal with a quality higher than a threshold is retrained in the buffer at the end of each DRX cycles. The control processor may check only the paging indicator channel for the current DRX cycle. Since the quality of the received signals remained high during the call setup delay, the UE wakes up at the end of the DRX cycle X+4 to process any positive call indicator if one is available.

FIG. 6 illustrates an example algorithm 600 for determining a call setup delay in accordance with an example embodiment of the invention. The example algorithm itself is self-explanatory and may be one of different ways to determine a call set up delay, based on the quality of the received PI indicator for the current and previous DRX cycles.

In one example embodiment, the algorithm 500 and the algorithm 600 may be implemented by the example apparatus 400. The algorithms are for illustration only and the steps of each of the algorithms may be combined, divided, or executed in a different order than illustrated, without departing from the scope of the invention of this example embodiment.

Figure 7:
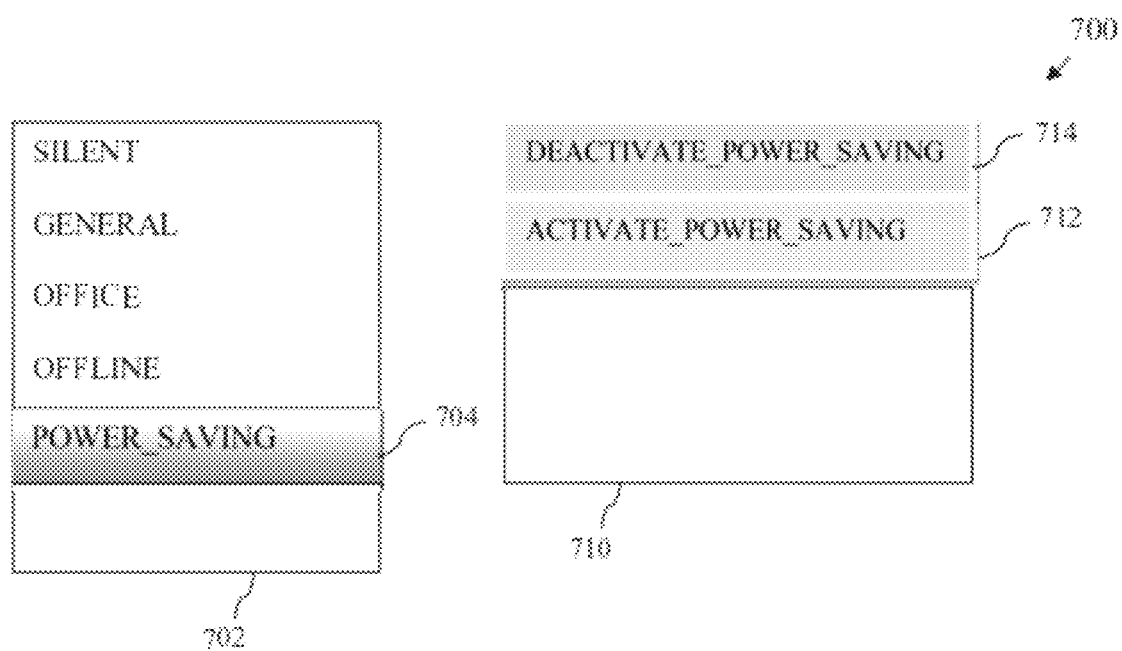
FIG. 7 illustrates an example user interface to support user manual activation and deactivation of power saving mode in accordance with an example embodiment of the invention.

FIG. 7 illustrates an example user interface 700 to support user manual activation and deactivation of power saving mode in accordance with an example embodiment of the invention. The example user interface 700 may include a menu 702 for operation modes and a submenu 710 for power saving operation mode. The menu 702 may include a menu item power_saving 704 among other menu items such as Silent, General, Office and Offline. The sub-menu 710 for the power-saving menu items may include an activate_power_saving option 712 and a deactivate_power_saving option 714. The activate_power_saving option 712 and the deactivate_power_saving option 714 may allow a user to manually activate or deactivate the power saving mode, independent of a predefined triggering event such as arrival of night time. The example user interface 700 may be part of the UE 102 and the UE 104 of FIG. 1.

FIG. 8 illustrates an example wireless apparatus in accordance with an example embodiment of the invention. In FIG. 8, the wireless apparatus 800 may include a processor 815, a memory 814 coupled to the processor 815, and a suitable transceiver 813 (having a transmitter (TX) and a receiver (RX)) coupled to the processor 815, coupled to an antenna unit 818. The memory 814 may store programs such as a power saving module 812. The wireless apparatus 800 may be at least part of a UE, or an LTE compatible mobile station.

The processor 815 or some other form of generic central processing unit (CPU) or special-purpose processor such as digital signal processor (DSP), may operate to control the various components of the wireless apparatus 800 in accordance with embedded software or firmware stored in memory 814 or stored in memory contained within the processor 815 itself. In addition to the embedded software or firmware, the processor 815 may execute other applications or application modules stored in the memory 814 or made available via wireless network communications. The application software may comprise a compiled set of machine-readable instructions that configures the processor 815 to provide the desired functionality, or the application software may be high-level software instructions to be processed by an interpreter or compiler to indirectly configure the processor 815.

In an example embodiment, the power saving module 812 may be configured to decide a number of sleep DRX cycles within a sleep cycle based at least on one of a current available battery power level, a call setup delay interval, and a quality of the paging indicator channel. The power saving module 812 may be configured to enter a power-saving mode upon an occurrence of a triggering event comprising an arrival of a time of a day such as night time when likelihood of receiving a call is low; and wake up from a sleep mode and checking for an active call after an expiration of the number of sleep DRX cycles.

In one example embodiment, the transceiver 813 is for bidirectional wireless communications with another wireless device. The transceiver 813 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 813, portions of the antenna unit 818, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 818 may be provided to convert between wireless signals and electrical signals, enabling the wireless apparatus 800 to send and receive information from a cellular network or some other available wireless communications network or from a peer wireless device. In an embodiment, the antenna unit 818 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 818 may include antenna tuning and/or impedance matching components, RF power amplifiers, and/or low noise amplifiers.

As shown in FIG. 8, the wireless apparatus 800 may further include a measurement unit 816, which measures the signal strength level that is received from another wireless device, and compare the measurements with a configured threshold. The measurement unit may be utilized by the wireless apparatus 800 in conjunction with various exemplary embodiments of the invention, as described herein.

In general, the various exemplary embodiments of the wireless apparatus 800 may include, but are not limited to, part of a UE, or a wireless device such as a portable computer having wireless communication capabilities, Internet appliances permitting wireless Internet access and browsing, as well as portable units or terminals that incorporate combinations of such functions. In one embodiment, the wireless apparatus 800 may be implemented in the UE 102 and the UE 104 of FIG. 1.

Without in any way limiting the scope, interpretation, or application of the claims appearing below, a technical effect of one or more of the example embodiments disclosed herein is that UE may save considerable amount of power during a time period of day when it is least likely to receive any call. Another technical effect of one or more of the example embodiments disclosed herein is that the power saving is achieved with little effect on the call setup delay and thus little effect on the user's perception of delay in receiving a call as well. A third technical effect is an increased reliability in receiving paging indicator because only high-quality PICH signal samples are kept and used.

Embodiments of the present invention may be implemented in software, hardware, application logic or a combination of software, hardware and application logic. The software, application logic and/or hardware may reside on user equipment such as a handset, a computer and other mobile device. If desired, part of the software, application logic and/or hardware may reside on user equipment, and part of the software, application logic and/or hardware may reside on a network element such as a base station. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

I claim:

1. A method, comprising:
   determining a sleep cycle comprising a number of discontinuous reception cycles at a user equipment based at least on one of a current available battery power level, a call setup delay interval, and a quality of a received paging indicator channel signal;
   entering a power saving mode during the determined sleep cycle at the user equipment upon an occurrence of a triggering event; and
   waking up from the power saving mode and checking for an active call after an occurrence of a second triggering event.

2. The method according to claim 1, wherein determining the sleep cycle further comprises determining the number of discontinuous reception cycles based on qualities of consecutively received paging indicator channel signals and a degree of mobility of the user equipment.

3. The method according to claim 1, wherein checking for the active call comprises one of checking a paging indicator channel for a positive paging indicator and checking a random access memory buffer for a stored positive paging indicator.

4. The method according to claim 1, wherein the triggering event comprises at least one of an arrival of a time of a day, a manual activation of the power saving mode by a user via a user interface, and the current available battery power level falling below a predetermined threshold wherein the arrival of the time of the day comprises the arrival of a night time when a likelihood of receiving a call is low.

5. The method according to claim 1, wherein the second triggering event comprises at least one of an expiration of the sleep cycle and a manual deactivation of the power saving mode by a user via a user interface.

6. The method according to claim 1, wherein entering the power saving mode further comprises waking up M times during the sleep cycle, wherein the sleep cycle comprises N discontinuous reception cycles, and 1<=M<N.

7. The method according to claim 1, further comprising:
receiving a value for the discontinuous reception cycles contained in a system information block message from an associated base station.

8. The method according to claim 1, wherein the sleep cycle is bound by smaller one of the call setup delay interval and a number of times the paging indicator is repeated.

9. The method according to claim 1, further comprising:
collecting paging indicator channel signal samples and obtaining a signal quality measurement of the collected paging indicator channel signal samples.

10. An apparatus, comprising:
at least one processor; and
at least one memory including computer program code for one or more programs,
the at least one memory and the computer program code configured to, with the at least one processor, cause the apparatus to perform at least the following:
determine a sleep cycle comprising a number of discontinuous reception cycles at a user equipment based at least on one of a current available battery power level, a call setup delay interval, and a quality of a received paging indicator channel signal;
enter a power saving mode during the determined sleep cycle at the user equipment upon an occurrence of a triggering event; and
wake up from the power saving mode and checking for an active call after an occurrence of a second triggering event.

11. The apparatus according to claim 10, further comprising:
a signal measurement unit configured to wake up and collect a paging indicator channel signal; and
a paging indicator random access memory buffer configured to store a paging indicator channel signal sample with a quality higher than a predefined threshold.

12. The apparatus according to claim 11, wherein the signal measurement unit is configured to wake up at each discontinuous reception cycle to collect the paging indicator channel signal sample without waking up other components of the apparatus.

13. The apparatus according to claim 12, further comprising a signal quality measurement unit configured to obtain a quality measurement of the collected paging indicator channel signal samples.

14. The apparatus according to claim 13, wherein the quality measurement of the collected paging indicator channel signal is based on an estimation of a path loss obtained from a received signal code power measure, a common pilot channel transmission power and an estimation of a downlink interference.

15. The apparatus according to claim 10, wherein the apparatus is further configured to cause a reselection process initiated when one or more low-quality paging indicator channel signals are received.

16. The apparatus according to claim 10, further comprising a user interface comprising an option to activate the power saving mode manually and a second option to deactivate the power-saving mode manually.

17. The apparatus according to claim 10, wherein the triggering event comprises at least one of an arrival of a time of a day, a manual activation of the power saving mode by a user via a user interface, and the current available battery power level falling below a predetermined threshold wherein the arrival of the time of the day comprise the arrival of a night time when a likelihood of receiving a call is low and wherein the second triggering event comprises at least one of an expiration of the sleep cycle and a manual deactivation of the power saving mode by the user via the user interface.

18. A non-transitory computer-readable medium carrying one or more instructions which, when executed by one or more processors, cause the one or more processors to perform a method comprising:
determining a sleep cycle comprising a number of discontinuous reception cycles at a user equipment based at least on one of a current available battery power level, a call setup delay interval, and a quality of a received paging indicator channel signal;
entering a power saving mode during the determined sleep cycle at the user equipment upon an occurrence of a triggering event; and
waking up from the power saving mode and checking for an active call after an occurrence of a second triggering event.

19. The non-transitory computer-readable medium according to claim 18, wherein the triggering event comprises at least one of an arrival of a time of a day, a manual activation of the power saving mode by a user via a user interface, and the current available battery power level falling below a predetermined threshold wherein the arrival of the time of the day comprise the arrival of a night time when a likelihood of receiving a call is low.

20. The non-transitory computer-readable medium according to claim 18, wherein the second triggering event comprises at least one of an expiration of the sleep cycle and a manual deactivation of the power saving mode by a user via a user interface.

* * * * *